Feb. 17, 1931.  J. F. MacINDOE  1,793,108
GREASE CUP
Original Filed July 7, 1927
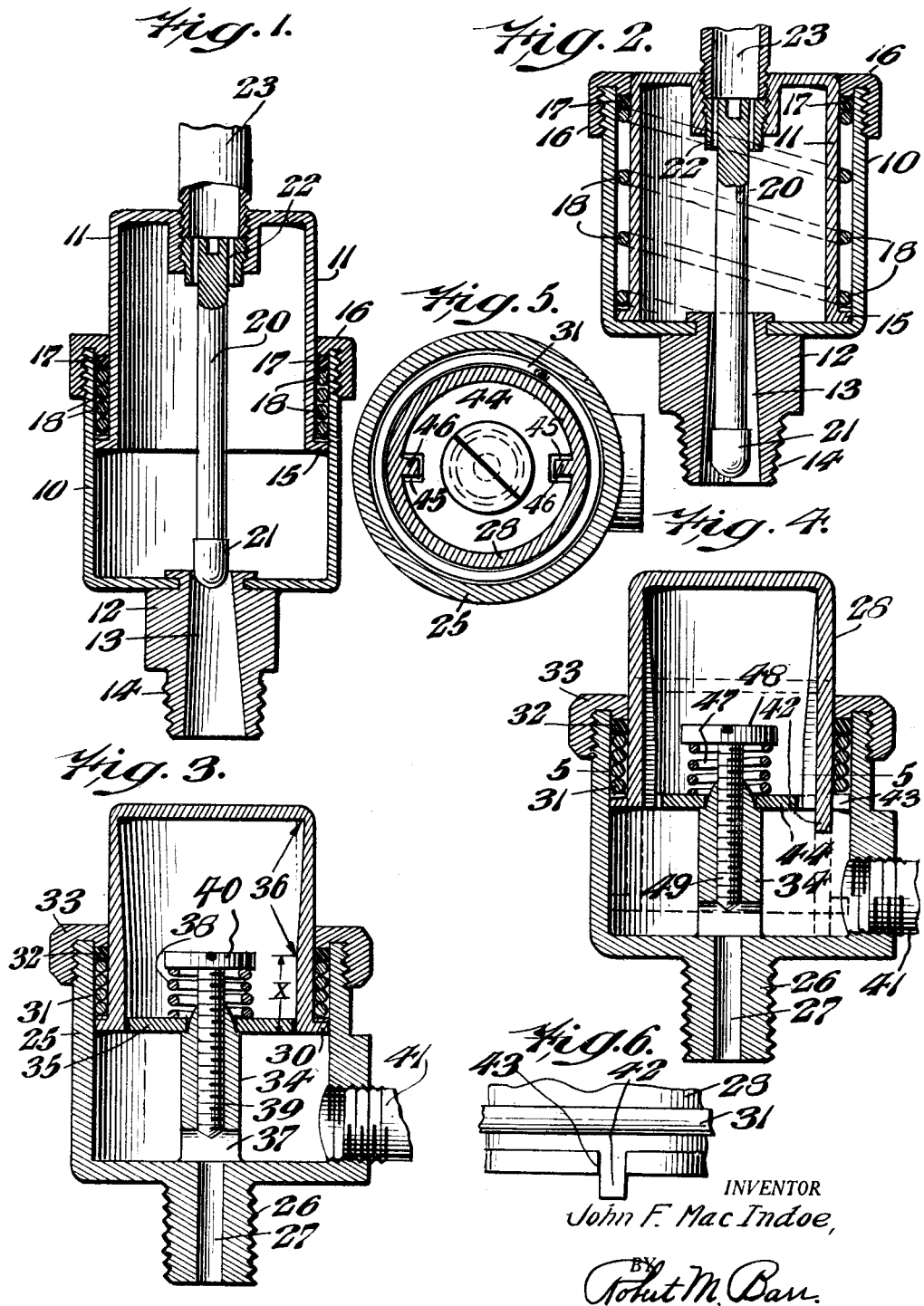
INVENTOR
John F. MacIndoe,
BY
Robert M. Barr
ATTORNEY Patented Feb. 17, 1931

1,793,108

UNITED STATES PATENT OFFICE

JOHN FRANKLIN MacINDOE, OF PHILADELPHIA, PENNSYLVANIA

GREASE CUP

Application filed July 7, 1927, Serial No. 204,092. Renewed June 28, 1930.

This invention relates to lubricating apparatus and more particularly to an automatic pressure controlled lubricating grease cup.

Some of the objects of the present invention are to provide an improved pressure actuated grease cup; to provide a grease cup in which the number of parts are reduced to a minimum; to provide a grease cup of the pressure operated type wherein the ordinary spring operated piston and its associated parts are dispensed with without any sacrifice in efficiency; to provide a telescopic grease cup actuating to supply a predetermined substantially constant quantity of grease to a bearing; to provide a grease cup having a casing formed of a fixed part and a relatively movable part operating automatically to force lubricant from the casing in a predetermined continuous flow which is regulated automatically according to requirements; to provide a grease cup wherein a grease container moves into another grease container to thereby discharge grease to a point of use in such a manner that the grease is proportioned in accordance with the pressure applied to the movable part; to provide an improved means for filling a grease cup and to provide other improvements as will hereinafter appear.

In the accompanying drawings:

Figure 1 represents a sectional elevation of one form of grease cup embodying the present invention with the parts shown in filled position;

Figure 2 represents a similar section of the same with the parts shown in discharged position;

Figure 3 represents a sectional elevation form of the invention embodying a different type of automatic control;

Figure 4 represents another form of the invention showing a still different type of automatic control;

Figure 5 represents a section on line 5—5 of Figure 4; and

Figure 6 represents a detail in side elevation of the cup flange construction.

Referring to the drawings, one form of the present invention consists of a two part shell or casing preferably of pressed metal comprising a cup-shaped receptacle 10 arranged to receive an inverted cup member 11. The receptacle 10 carries an axially arranged shank 12 having a passage 13 communicating with the inside of the receptacle 10 and forming the grease discharge outlet therefrom. This shank 12 is theaded as shown at 14 for connection to a part to be lubricated, and it, as well as the receptacle 10, are normally fixed parts. The cup member 11 is of smaller diameter than the diameter of the receptacle 10 and has an annular flange 15 of such dimensions as to form a tight sliding fit in the receptacle 10.

In order to connect the two parts of the casing 10 and 11 for the desired relative movement, the upper end of the receptacle 10 is threaded to receive an internally threaded cap 16 which fits snugly against the sides of the cup 11 and bears against an annular gasket 17 which is designed to prevent leakage along the joint between the parts. Between this gasket 17 and the flange 15 there is interposed a coil spring 18 the function of which is to force the cup 11 into the receptacle 10 and thus cause any contained lubricant in the receptacle 10 to be discharged by way of the outlet passage 13.

For the purpose of regulating and proportioning the discharge of lubricant through the passage 13, the cup 11 carries an axially mounted stem 20 which terminates in a valve plug 21 which passes through the inlet of the passage 13 with sufficient clearance to allow a predetermined quantity of grease to be discharged when the latter is under pressure transmitted by the cup 11 and spring 18. Since it has been found that the initial expansion of a coiled spring is substantially constant for about one-fourth of the discharging stroke, this valve plug 21 has a constant diameter for a length corresponding to the length of this quarter stroke and hence the valve plug 21 can move through the inlet of the passage 13 its entire length without any variation in the quantity of grease being discharged. At the end of an approximate quarter stroke, however, there is a gradual weakening of the spring pressure, and to compensate for this, the passage 13 is preferably outwardly tapered as shown in Figure 1 so that as the plug 21 travels toward the outlet of the passage, the quantity of grease will gradually increase in proportion to the lessening of spring pressure though the supply to the part lubricated will remain constant. While this form of automatic proportioning control is the preferred one, it is to be understood that the invention is not limited to this particular construction since any other type of control may be employed without departing from the present invention.

In order to fill this type of telescopic cup, the end of the cup member 11 is centrally spun, pressed, or otherwise shaped, to form an axially arranged internally threaded part into which the control valve member is threaded and supported, and the head of this valve member is provided with through ports 22 for the passage of the incoming lubricant as forced through a suitable nipple 23 of any standard type to which the end of a grease gun or other lubricant supplying means can be attached.

In Figure 3 a modified form of the invention is shown wherein a fixed cup receptacle 25 is provided and formed with a threaded shank 26 for attachment to the part to be lubricated and which shank is of tubular form to provide a passage 27 communicating with the interior of the receptacle 25. As in the form shown in Figure 1, the receptacle 25 is arranged to receive an inverted cup 28 having an outwardly disposed circumferential flange 30 which has a sliding fit within the receptacle 25 and forms a seat for the pressure spring 31. This latter element 31 is interposed between a gasket 32 and the flange 30 and is held under compression by means of a cap nut 33 which is threaded on the extremity of the receptacle 25.

For the purpose of regulating the discharge of grease from the telescopically connected cups 25 and 28, the former is provided with an axially disposed post 34 which is shouldered to receive a control plate 35 which is located in the mouth of the cup 28 but has a diameter slightly less than the internal diameter of the mouth in order to permit discharge of grease about the periphery of the plate 35. In this connection, it will be noted that the internal diameter of the cup 28 is uniform for a distance indicated by X and corresponding to approximately one-fourth of the stroke of the cup 28 under the influence of its spring 31 but thereafter its internal diameter gradually increases (as shown at 36) until the end of the cup is reached so that there is a gradual increase in the amount of grease discharged and proportionate to the weakening of the control spring 31. Thus as the cup 28 descends over the plate 35 the clearance between the outer edge of the plate 35 and the inside of the cup 28 will gradually increase after the cup has descended for approximately one-fourth of its stroke and the grease be forced out of the cup 25 by way of a through port 37 in the post communicating with the passage 27. In connection with the plate 35, it should be noted that this is loosely seated upon the post 34 and held in place by a coiled spring 38 compressed between the disc 35 and the head of a screw 40 which is threaded into the post 34. This construction allows the plate 35 to lift against the tension of the spring 38 when grease is introduced into the receptacle 25 in order to fill the cup.

For the purpose of introducing grease under pressure into a receptacle 25, a grease gun nipple 41 is threaded into the side of the receptacle 25 and communicates with the interior thereof, and when a grease gun coupler is attached to the nipple 41, grease can be forced into the cup and thus fill the cup 28. When the cup 28 is empty and in its lowermost position, provision is made for the entering grease to pass around the lower edge of the cup 28 by cutting the flange 30 at two places and bending the intermediate portion of the flange downward to form a vertical slot 42 and a limit stop 43, which latter prevents the cup 28 from extending down and seating flush on the bottom of the receptacle 25.

In Figure 4 another form of the automatic control is shown and since generally the parts of the cup are the same as in Figure 3, like parts have been identified by like reference numerals. In this form of the invention a plate 44 is seated upon the post 34 and has a diameter which allows it to fit snugly inside of the cup 28 and passage of grease takes place by way of marginal openings 45 which are arranged in aligned relation respectively with ribs 46 formed upon the inside of the cup 28 and extending lengthwise thereof. These ribs are of uniform width having a distance corresponding approximately to one-fourth of the stroke of the cup 28 but from this point on to the end of the cup 28 are tapered in such a manner that as the cup descends there will be a gradually increasing quantity of grease forced from the cup 28 into the cup receptacle 25. The plate 44 in this modification is also loosely mounted upon the post so that it can be forced upward by the incoming grease when filling the cup and thus performs the function of a lift valve which is normally maintained closed by a coil spring 47 held in tension by the head 48 of a screw 49. The filling construction of this cup is the same as that shown in Figure 3, though obviously it may be filled by threading a fitting into the end of the cup, as shown in Figures 1 and 2.

It will now be apparent that a complete unitary lubricator has been provided wherein a movable piston and its associated elements has been dispensed with, and in lieu thereof a simple and effective automatically proportioned feeding device has been provided for accomplishing the desired constant lubrication of a bearing or other part. Furthermore, the lubricator of this construction with its outwardly flanged cup permits the part to be readily taken apart for renewal or repair and this can be done by simply unscrewing the connecting packing nut by which the parts are held together. In addition, the lubricator is so constructed as to automatically compensate for weakening of the operating spring and producing the desired substantially constant quantity supply of lubricant to the bearing.

What is claimed as new and useful is:

1. A grease cup comprising a casing formed of two interfitting cup members, one sliding within the other, and the latter having a discharge outlet, a spring compressed to cause one cup member to move into the other cup member to discharge grease through said outlet, means for introducing grease under pressure into said cup members, and means including a valve carried by said movable cup member for proportioning the discharge of grease in accordance with the variation of spring pressure.

2. A grease cup comprising a casing formed of two interfitting cup members, one sliding within the other and the latter having a discharge outlet, a spring compressed to cause one cup member to move into the other cup member, means for introducing grease under pressure into said cup members, and grease control means automatically causing a uniform discharge of grease through said outlet for a portion of the movement of said movable cup member and then causing a gradual increase in the discharge of grease for the remaining portion of said movement.

3. A grease cup comprising a casing formed of two interfitting cup members one sliding within the other and the latter having a discharge outlet, a spring compressed to cause one cup member to move into the other cup member, a lift plate valve in said movable cup member and arranged to open under filling grease pressure, said plate valve forming a passage for grease between it and the internal wall of said member, and means operative after a predetermined movement of said member for increasing the size of said passage.

4. A grease cup comprising a casing formed of two interfitting cup members one sliding within the other and the latter having a discharge outlet, a spring compressed to cause one cup member to move into the other cup member, a lift plate valve in said movable cup member and arranged to open under filling grease pressure, said plate valve forming a passage for grease between it and the internal wall of said member, and means for maintaining said passage constant for a part of the movement of said movable cup member and for increasing the size of said passage for another part of the movement of said movable cup member.

5. A grease cup comprising a casing formed of two interfitting cup members one sliding within the other and the latter having a discharge outlet, a spring compressed to cause one cup member to move into the other cup member, a lift plate valve in said movable cup member and arranged to open under filling grease pressure, said plate valve forming a passage for grease between it and the internal wall of said member, and means, including a control element having one part of uniform dimension and another part of gradually diminishing dimension, for controlling said passage.

Signed at Philadelphia, county of Philadelphia, State of Pennsylvania, this 5th day of July, 1927.

JOHN FRANKLIN MacINDOE.